US005369561A

United States Patent [19]
McCullough

[11] Patent Number: 5,369,561
[45] Date of Patent: Nov. 29, 1994

[54] STANDBY POWER SUPPLY SYSTEM HAVING A VARIABLE FREQUENCY INVERTER

[75] Inventor: David J. McCullough, Chicago, Ill.

[73] Assignee: Trippe Manufacturing Company, Chicago, Ill.

[21] Appl. No.: 118,510

[22] Filed: Sep. 8, 1993

[51] Int. Cl.$^5$ .......................................... H02M 5/458
[52] U.S. Cl. ......................................... 363/37; 363/49
[58] Field of Search .................... 363/49, 142, 34, 37; 323/901, 345

[56] References Cited

U.S. PATENT DOCUMENTS

| | | | |
|---|---|---|---|
| 4,780,805 | 10/1988 | Chewuk et al. | 363/142 |
| 4,928,218 | 5/1990 | Kluttz | 363/37 |
| 5,032,970 | 7/1991 | Telefus | 363/37 |
| 5,212,360 | 5/1993 | Carlson | 219/10.55 B |

OTHER PUBLICATIONS

"Principles of Solid-State Power Conversion," pp. 565–566, 578–583, by Ralph E. Tarter, Howard W. Sams & Co., 1985.

"The Theory and Practice of Overcurrent Protection," pp. 7–8, 50 and 140, by Patrick J. McCleer, Mechanical Products Inc., 1987.

"The Art of Electronics," pp. 286–290, 507–510, by Paul Horowitz, Cambridge University Press, 2nd Edition, 1989.

Primary Examiner—Steven L. Stephan
Assistant Examiner—Adolf Berhane

[57] ABSTRACT

A standby power supply system is provided which prevents saturation of magnetic components thereof during its initial start-up. The power supply system includes a variable frequency inverter that is responsive to control signals for generating an initial frequency which is higher than the frequency of the utility line voltage and which is swept down gradually to the frequency of the line voltage when a detected logic signal is at the low logic level.

19 Claims, 4 Drawing Sheets

STANDBY POWER SUPPLY SYSTEM HAVING A VARIABLE FREQUENCY INVERTER

BACKGROUND OF THE INVENTION

This invention relates generally to standby power systems and more particularly, it relates to an improved standby power supply system which includes a variable frequency inverter so as to reduce stress of the components thereof during its initial start-up.

As is generally known in the design of off-line standby power systems, there has been encountered a problem of how to reduce the stress that exists on the inverter components during the transition from a standby mode of operation to an active backup mode of operation. There are two major sources that cause this stress: (1) the activation of the solid-state inverter before the input line connection is completely disconnected from the utility power source, and (2) the saturation of the magnetic components in the inverter or load. Thus, the standby power system designers must be careful so as to take into consideration this stress factor. Otherwise, the stress could cause a failure of the inverter at a critical point of operation of the standby power system.

The first source for the stress is due to the fact that a fast-acting electro-mechanical relay is usually employed in low-cost standby power systems for transferring the line connection. The relay of this type will typically be able to sustain an arc across its contacts until the applied current crosses through zero. However, since the back-up power system is attempting to power both the main power source (grid) as well as the protected load during this arcing interval, there will be created high peak currents which reduce the inverter output voltage to the load and may also cause damage to the inverter components.

To date, the prior art solutions to the first source of the stress have involved either the use of a solid-state switch for performing the line disconnecting function (transfer operation) or the delaying of the turn-on of the inverter for a period of time which is greater than a half-cycle of the line frequency. Although the use of the solid-state switch eliminates the arcing, it has the disadvantage of a substantial increase in cost. While the delayed turn-on of the inverter ensures that a zero-crossing will occur, this approach suffers from the disadvantage of adding additional delay to the already existing system delays (i.e., line detector response time, relay contact transfer time, etc.) which increases the minimum acceptable utility voltage or requires greater reserve capacity in the load power supply.

The stress created by the second source is the result of high current pulses being generated upon the initial turn-on of the back-up power source which may damage or physically destroy components in the inverter as well as reducing the available voltage to the load. Further, this problem becomes even more aggravated when the inverter waveform is a squarewave or stepped waveform since this does not insure a balance of flux in the magnetic components. In the past, there has been made an attempt to solve this problem by using a sine-wave inverter which is phase-synchronized to the primary power source or grid. While this technique is effective in minimizing the possibility of saturation due to the flux imbalance, there is created the drawbacks of a significant increase in system costs and overall complexity due to the need for the phase locking and sine-wave generation.

Another prior art method for preventing saturation is to provide means for monitoring peak currents and for shutting down the inverter for a period of time equal to the utility line frequency or for decreasing the pulse width upon the detection of excessive current peaks. There is a serious disadvantage in this prior art method since it extends the period when the backup power is not being supplied to the load.

It would therefore be desirable to provide an improved standby power supply system which prevents saturation of the magnetic components thereof during its initial start-up. Further, it would be expedient that the standby power supply system be manufactured with a relatively small increase in the overall system costs.

SUMMARY OF THE INVENTION

Accordingly, it is a general object of the present invention to provide an improved standby power supply system which is relatively simple and economical to manufacture and assemble, but yet overcomes the disadvantages of the standby power systems traditionally available.

It is an object of the present invention to provide an improved standby power supply system which prevents saturation of magnetic components thereof during its initial turn-on of an inverter.

It is another object of the present invention to provide an improved standby power supply system which reduces the stress on inverter components caused by arcing of relay contacts.

It is still another object of the present invention to provide an improved standby power supply system which includes a variable frequency inverter so as to prevent saturation of magnetic components thereof during its initial start-up.

It is yet still another object of the present invention to provide an improved standby power supply system which includes an inverter means and control circuit means having oscillator means for generating drive signals to the input of the inverter means, the drive signals having an initial high frequency during start-up which is swept down gradually to the frequency of the line voltage.

In accordance with these aims and objectives, the present invention is concerned with the provision of a standby power supply system for reducing stress and preventing saturation of magnetic components in an inverter during initial start-up. Input terminal means are connectible to a main A.C. power source for receiving a utility line voltage, and output terminal means are connectible to a load. Line detection means is provided which is responsive to the utility line voltage for generating a detected logic signal which is at a low level when the utility line voltage is less than a predetermined minimum voltage value. An inverter means includes an input and an output.

A switch means is responsive to the detected logic signal for disconnecting the load from the input terminal means and for connecting the load to the output of the inverter means. An oscillator means responsive also to the detected logic signal is provided for generating drive signals to the input of the inverter means. The drive signals have an initial higher frequency during start-up which is swept down gradually to the frequency of the line voltage. Timing means responsive to the detected logic signal is provided for delaying the drive signals to the input of the inverter for a predetermined time so as to insure that the load has been disconnected from the input terminal means. The higher frequency of the drive signals during start-up eliminates stress of the magnetic components in the inverter means and limits duration of current surges caused by the switch means.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
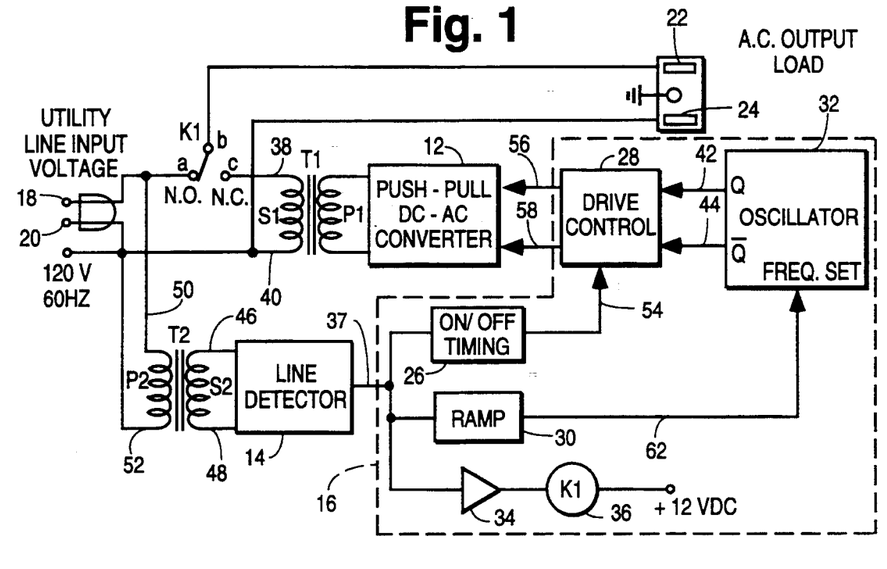
FIG. 1 is a block diagram of an off-line standby power supply system, constructed in accordance with the principles of the present invention.

Referring now in detail to the drawings, there is shown in FIG. 1 a block diagram of an improved off-line standby power supply system 10 constructed in accordance with the principles of the present invention. The standby power supply system 10 includes a push-pull DC-AC converter (inverter) 12, a line voltage detector circuit 14, and control circuitry 16. There are provided a pair of input terminals 18 and 20 which are connectible to a main utility power source or grid (not shown) for receiving a primary input line voltage of 120 VAC having a frequency of 60 Hz. There are provided also a pair of output terminals 22 and 24 which are connectible to a protected load (also not shown). The control circuity 16 includes an on/off timing circuit 26, a drive control circuit 28, a ramp circuit 30, an oscillator 32, an inverter 34, and a transfer relay (K1) 36.

During the normal standby mode of operation, the timing circuit 26 will maintain the drive control circuit 28 in the off-condition so as to turn off the DC-AC converter 12, and the inverter 34 will cause the relay 36 to be energized. As a result, the primary input line voltage (120 VAC) from the main utility power grid on the input terminals 18 and 20 will be connected to the load via the normally-open contacts c-a of the relay 36 and the output terminals 22 and 24. It will be noted that the relay contacts are shown in the energized condition. When the line voltage of the main utility power source decreases below a predetermined minimum value, the output of the line voltage detector circuit 14 on line 37 will cause the transfer relay 36 via the inverter 34 to become de-energized. Consequently, the load will be connected via the normally-closed contacts c-b to the lines 38 and 40 which are tied to the secondary S1 of the transformer T1. The primary P1 of the transformer T1 is connected to the output of the DC-AC converter 12.

Simultaneously, the output of the line detector circuit 14 will cause the voltage at the output of the ramp circuit 30 to begin ramping up to a certain positive voltage. This ramp voltage defining a sweep signal is fed to a frequency set terminal on the oscillator 32, which causes the oscillator frequency to sweep gradually down from 300 Hz to the line frequency (60 Hz). Drive signals at the outputs of the oscillator on lines 42 and 44 are fed to the input of the drive control circuit 28. The output of the line detector circuit 14 will also cause a drive control signal from the output of the on/off timing circuit 26 to enable the outputs of the drive control circuit 28 after a certain delay. This delay ensures that the relay contacts will have completed their switching so as to disconnect the line voltage from the load and to connect the load to the output of the DC-AC converter 12 via the transformer T1 before the initial start-up of the converter. After this delay, the converter will be switched ON and OFF initially at the oscillator frequency of 300 Hz. In this manner, the stress on the inverter component caused by the arcing of the relay contacts is reduced.

When the line voltage increases to above the certain minimum value, the output of the line detector circuit 14 will cause the transfer relay 36 via the inverter 34 to become energized again. Consequently, the load will be reconnected to the input terminals 18 and 20 via the normally-open contacts c-a. Simultaneously, the output of the line detector circuit will cause the voltage at the output of the ramp circuit 30 to become quickly discharged. This will, in turn, cause the oscillator frequency to increase rapidly to the frequency of 300 Hz. Finally, the converter 12 will be turned off after a certain delay so as to insure that the relay contacts have settled in the energized position.

It should be noted that the initial start-up frequency of the converter 12 is selected to insure that the magnetic components thereof will not saturate during initial activation. The factors to be considered are the flux density margin selected for normal operation and the saturation characteristics of the core material. Typically, an initial start-up frequency is chosen to be approximately 3 to 6 times the utility line frequency. The sweep period must be long enough to insure that the interval between zero crossovers is short during the period of relay arcing and contact bounce, which is a function of the relay characteristics. It has been found that a sweep period of approximately 16 milliseconds is quite adequate for most relays.

Figure 2:
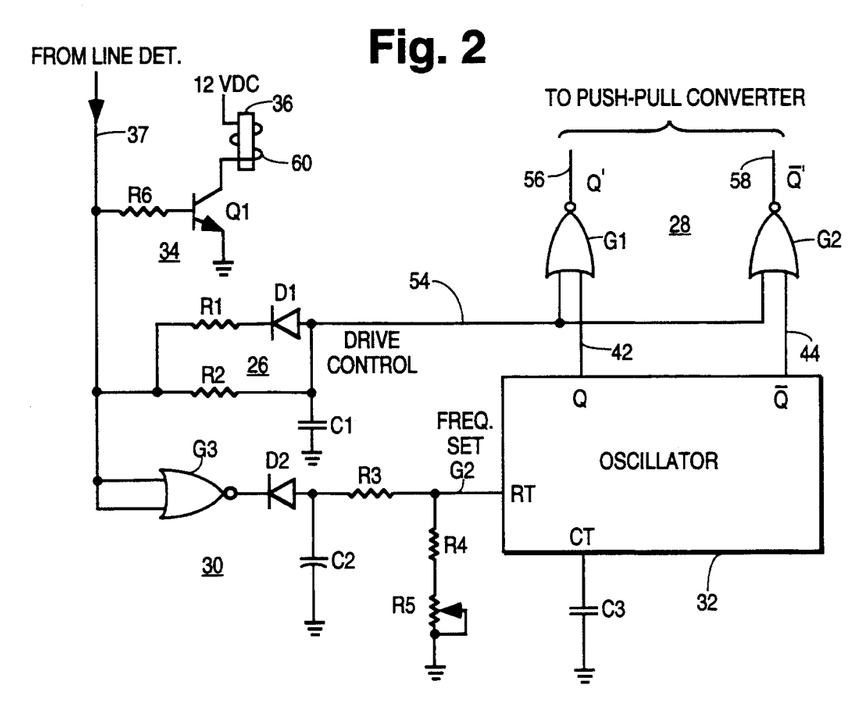
FIG. 2 is a detailed circuit diagram of the control circuitry of FIG. 1.

The input of the line detector circuit 14 on lines 46, 48 are connected to the secondary S2 of the transformer T2. The primary P2 of the transformer T2 is coupled to the input terminals 18 and 20 via lines 50, 52. The output of the line detection circuit on the line 37 provides a detected logic signal. The detected logic signal is at a high level when the line voltage is above the predetermined minimum voltage value. The detected logic signal is at a low level when the line voltage is below the predetermined minimum voltage value. The timing circuit 26, ramp circuit 30, and the inverter 34 of the control circuitry 16 in FIG. 1 is responsive to this detected logic signal. A detailed schematic circuit diagram of the control circuitry 16 of FIG. 1 is illustrated in FIG. 2.

The off/on timing circuit 26 of the control circuitry 16 includes resistors R1, R2; a timing capacitor C1; and a diode D1. One end of the resistor R1 is connected to one end of the resistor R2 and to the line 37 for receiving the detected logic signal from the line detector circuit. The other end of the resistor R1 is connected to the cathode of the diode D1. The other end of the resistor R2 is connected to the anode of the diode D1, one end of the capacitor C1, and line 54. The other end of the capacitor C1 is connected to a ground potential. The drive control signal is provided on the output of the timing circuit 26 on the line 54. The drive control circuit 28 is formed by a pair of NOR logic gates G1, G2. A first input of each NOR gate G1, G2 is connected to the line 54 for receiving the drive control signal. The second input of the gate G1 is connected to the Q output of the oscillator 32 on line 42, and the second input of the gate G2 is connected to the output $\bar{Q}$ output of the oscillator on the line 44. The outputs Q and $\bar{Q}$ from the oscillator define first and second push-pull drive signals, respectively. The output Q' of the gate G1 on line 56 is connected to a first input of the converter 12, and the output $\bar{Q}$, of the gate G1 on line 58 is connected to a second input of the converter 12. It will be noted that the outputs of the NOR gates correspond to the outputs of the drive control circuit 28.

The ramp circuit 30 of the control circuitry 16 includes a NOR logic gate G3, a diode D2, resistors R3 and R4, a potentiometer R5, and a timing capacitor C2. The inputs of the gate G3 are connected together and to the line 37 for receiving also the detected logic signal. The output of the gate G3 is connected to the cathode of the diode D2. The anode of the diode D2 is connected to one end of the capacitor C2 and to one end of the resistor R3. The other end of the capacitor C2 is connected to the ground potential. The other end of the resistor R3 is connected to one end of the resistor R4 and to the frequency set at the terminal $R_T$ of the oscillator 32. The other end of the resistor R4 is coupled to the ground potential via the potentiometer An external capacitor C3 is connected between the input terminal $C_T$ of the oscillator and the ground potential.

The inverter 34 of the control circuitry includes a current-limiting resistor R6 and an NPN-type transistor Q1. The transistor has its base coupled to the line 37 via the resistor R6 for receiving also the detected logic signal. The collector of the transistor Q1 is connected to one end of the coil 60 of the relay 36 and the emitter thereof is connected to the ground potential. The other end of the coil 60 is connected to a dc supply potential of +12 VDC.

Figure 4:
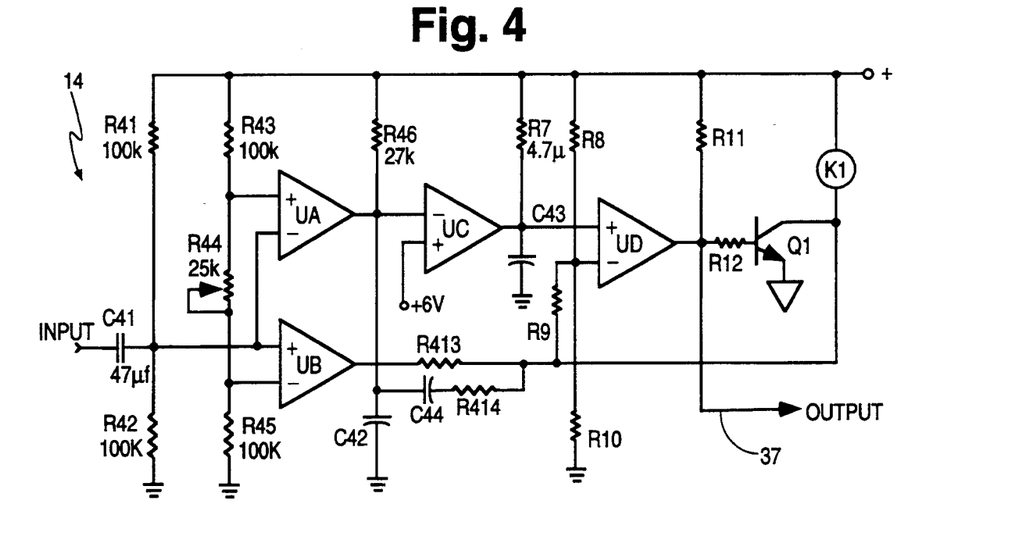
FIG. 4 is a schematic circuit diagram of the line voltage detector of FIG. 1.

In FIG. 4, there is shown a schematic circuit diagram of the line voltage detector 14 of FIG. 1. The line detector 14 includes two comparators UA and UB which monitor the respective positive and negative half-cycles of the line voltage. The outputs of the comparators UA and UB are "OR-tied" together via output pins 13 and 14. A capacitor C42 will be charged only during the time when the AC input line voltage is near zero volts. When either the input pin 10 is more positive than the input pin 11 on the comparator UA or the input pin 9 is more negative than the input pin 8 on the comparator UB, the outputs thereof will be sinking current so as to maintain the capacitor C42 discharged. The amount of time which is given for the capacitor C42 to charge up towards +12 volts via the resistor R46 is inversely proportional to the line voltage.

As long as the line voltage remains above the predetermined minimum value, the reference voltage of +6 volts on the non-inverting input of the comparator UC will be greater than the peak voltage on the capacitor C42. As a result, the output of the comparator UC will be high. This high is fed to the non-inverting input of the op amp UD. The output of the op amp UD will also be high so as to maintain the inverter transistor Q1 to be conductive. The output of the op amp UD is also fed to the timing circuit 26 and the ramp circuit 30 via the line 37.

On the other hand, when the line voltage drops below the predetermined minimum value, the peak voltage on the capacitor C42 will exceed the reference voltage. Consequently, the output of the comparator UC will go low, thereby discharging the capacitor C43. This will, in turn, cause the output of the op amp UD to go low so as to render the transistor Q1 to be non-conductive. The capacitor 43 will maintain the output of the line detector 14 on the line 37 at the low level for approximately three seconds after the line voltage increases above the certain minimum value. A feedback network formed by resistors R413, R414 and capacitor C44 is used to provide hysteresis to the line detector 14 so that the transfer voltage from the backup to the standby mode will be approximately 5% higher than the transfer voltage from the standby to backup mode.

Figure 5:
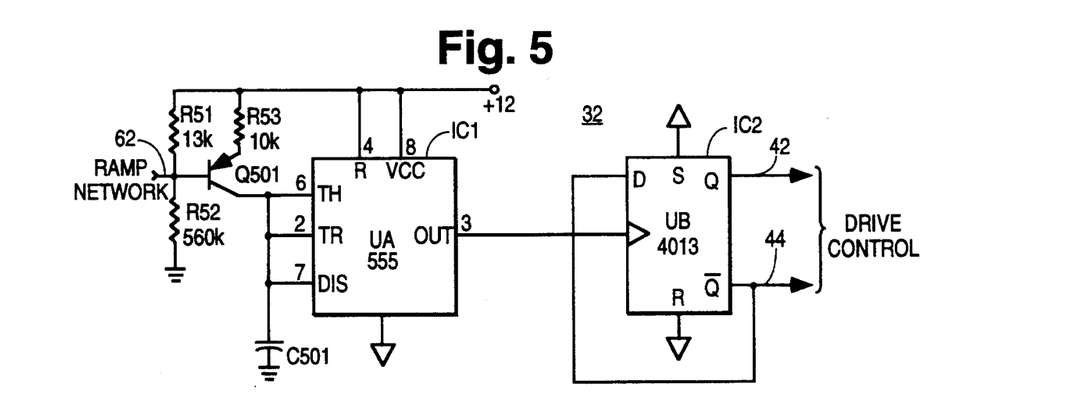
FIG. 5 is a schematic circuit diagram of the oscillator of FIG. 1.

In FIG. 5, there is shown a schematic circuit diagram of the oscillator 32 of FIG. 1. The oscillator 32 includes a timer circuit IC1 and a flip-flop circuit IC2. The output of the timer circuit on pin 3 is a negative-going pulse train whose frequency is controlled by timing capacitor C501 and the collector current from the transistor Q501. The base of the transistor Q501 is connected to receive the frequency set signal on the line 62 from the ramp circuit 30. As the voltage at the base increases, the collector current in the transistor Q501 decreases so as to decrease the frequency of the pulse train on pin 3. The output pin 3 of the timer circuit IC1 is connected to the clock input of the flip-flop circuit IC2. The Q and $\bar{Q}$ outputs of the flip-flop circuit provide the first and second push-pull drive signals which are complementary squarewaves on the respective lines 42 and 44.

Figure 6:
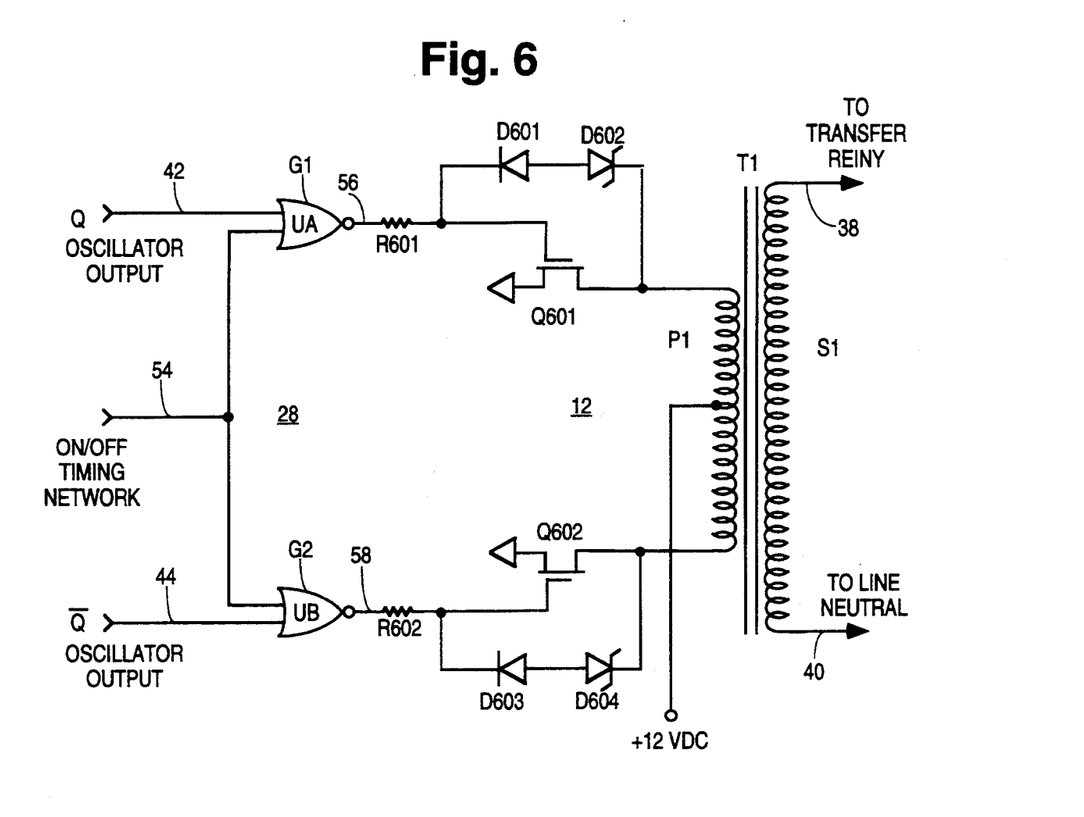
FIG. 6 is a schematic circuit diagram of the drive control circuit and the inverter of FIG. 1.

In FIG. 6, there is depicted a schematic circuit diagram of the drive control circuit 28 and the inverter 12 of FIG. 1. The inverter 12 is comprised of two N-channel FET power switches Q601 and Q602. The transistor switch Q601 has its drain connected to one side of the primary P1 of the transformer T1, its source connected to a ground potential and its gate connected to the output of the NOR gate G1 on line 56 via a resistor R601. The transistor switch Q602 has its drain connected to the other side of the primary P1, its source connected to the ground potential, and its gate connected to the output of the NOR gate G2 on line 58 via a resistor R602. The operation of the drive control circuit 28 formed by the NOR gates G1 and G3 has already been explained with reference to FIG. 2 and will not be repeated.

When the NOR gates G1 and G2 are enabled, the first and second drive signals from the oscillator 32 causes the switches Q601 and Q602 to turn on during alternate half cycles which will convert a low voltage DC (i.e., +12 VDC) applied to the center tap of the primary P1 to high-voltage AC squarewave on the lines 38 and 40 connected to the secondary S1 of the transformer T1. This AC squarewave is supplied to the external load during the backup mode via the normally closed contacts of the relay 36. Zener diodes D602, D604 and diodes D601, D603 serve as protection circuits for protecting the power switches Q601, Q602.

Figure 3:
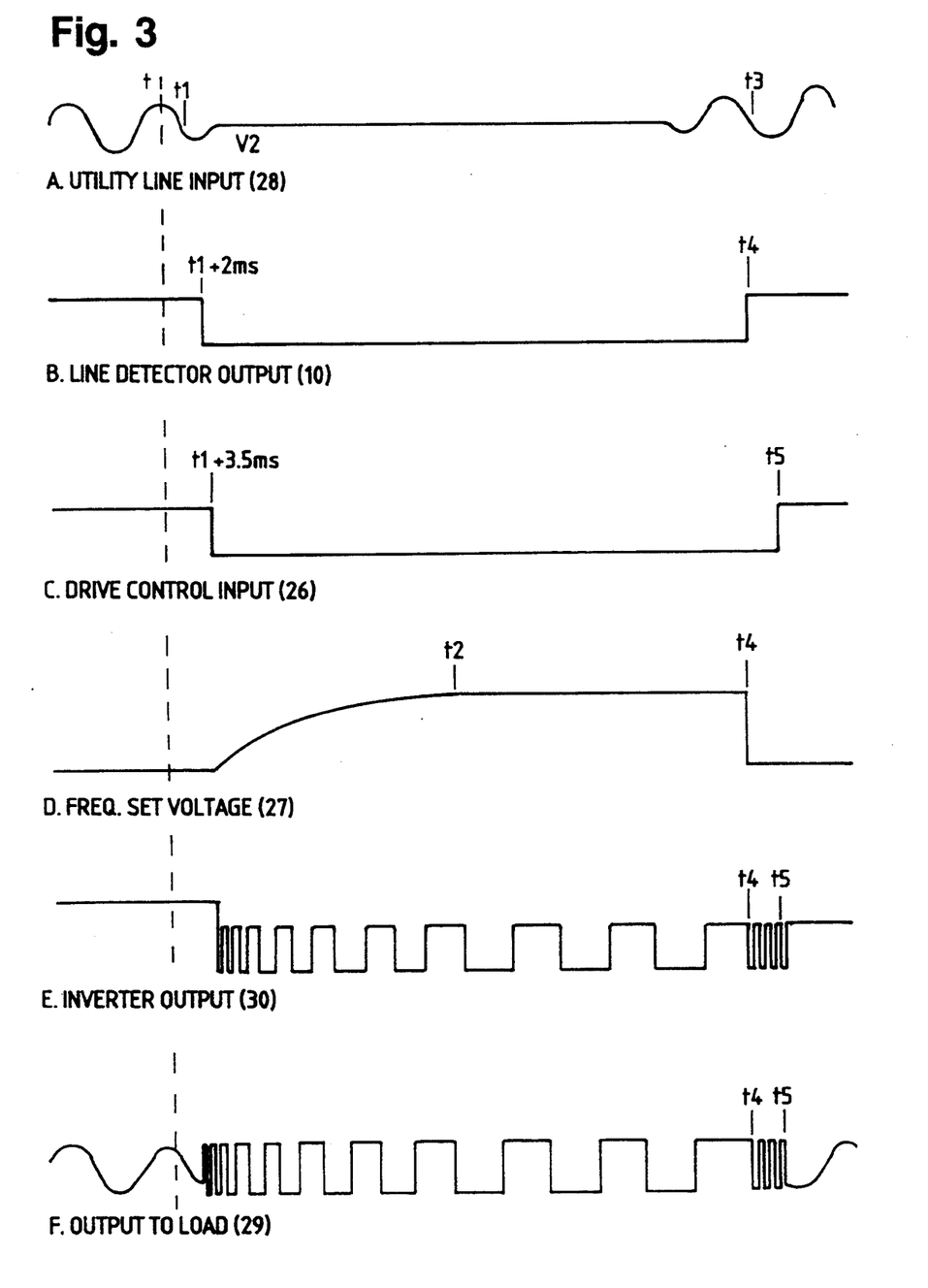
FIGS. 3(a)-3(f) are waveforms at various points in FIGS. 1 and 2, useful in understanding the operation of the present invention.

Reference is now made to the waveform diagrams in FIGS. 3(a)–3(f) which are useful in understanding the operation of the improved standby power supply system 10 of FIG. 1 and the control circuitry 16 of FIG. 2. It will be assumed that the line voltage V1 from the main power source connected to the terminals 18 and 20 is above the predetermined minimum level prior to time tφ, as illustrated in FIG. 3(a). Accordingly, the detected logic signal on the line 37 from the detection circuit will be at a high logic level, which is depicted in FIG. 3(b).

As a consequence, the inverter transistor Q1 will be turned on so as to energize the transfer relay 36. Thus, the input terminals 18 and 20 will be connected to the protected load connected to the output terminals 22 and 24 via the normally-open contacts c-a of the relay 36. Further, the detected logic signal, which is at +12 VDC, will have already charged up the timing capacitor C1 via the resistor R2 so as to cause the drive control signal on the line 54 to be at a high logic level. This is shown in FIG. 3(c). This will, in turn, cause the NOR gates G1 and G2 to be disabled thereby preventing the first and second push-pull drive signals on the lines 42 and 44 from reaching the input of the converter 12. Therefore, the output of the converter 12 will be turned off at the time tφ, as shown in FIG. 3(e). In addition, the detected logic signal being at the high logic level is inverted by the NOR gate G3, which discharges the ramp capacitor C2 and clamps the output of the ramp circuit 30 on line 62 (frequency set terminal) to a near zero voltage, as shown in FIG. 3(d). This will set the oscillator frequency to be running at approximately 300 Hz.

Assume now that the utility line voltage drops below the predetermined minimum level (i.e., voltage V2) at time t1. The line detector circuit 14 monitoring the utility line voltage will respond within a half-cycle to variations in voltage below the predetermined minimum. Therefore, at time t1 +2 mS the detected logic signal will change to a low logic level (i.e., 0 volts). As a result, the relay 36 will become de-energized and will connect the load to the lines 38 and 40 at the secondary S1 of the transformer T1. The detected logic signal being at the low level will be inverted by the gate G3 so as to reverse bias the diode D2, thereby allowing the ramp capacitor C2 to charge up to approximately 99% of the final value at time t2.

Between the times t1 and t2, the frequency set signal on the line 62 will charge up as shown in FIG. 3(d) which sweeps the oscillator frequency of 300 Hz gradually down to the steady state or operating line frequency of 60 Hz. However, it will be noted that the drive signals at the oscillator output are prevented from reaching the input of the converter 12 at the time t1. This is because the drive control signal on the line 54 (FIG. 3(c)) will still be at the high level thereby disabling the NOR gates G1 and G2. When the detected logic signal goes low at time t1+2 mS, this will cause the timing capacitor C1 to discharge through the parallel resistors R1 and R2. After a delay of approximately 1.5 ms (determined by the values of the capacitor and resistors), the drive control signal will go low at the time t1a thereby enabling the gates G1 and G2. Then, the push-pull drive signals will appear on the lines 56 and 58 so as to switch the converter 12 ON and OFF at the initial oscillator frequency of 300 Hz. The output voltage to the load is shown in FIG. 3(f).

When the line voltage rises above the predetermined value at time t3 (i.e., voltage V1), the detected logic signal at the output of the line detector circuit 14 will return to a high logic level (+12 volts) at the time t4.

This causes the relay 36 to become energized again and reconnect the load to the input terminals 18 and 20 via the normally-open contacts c-a. Further, the detected logic signal being at the high logic level will be inverted by gate G3 so as to quickly discharge the ramp capacitor C2. This will, in turn, cause the frequency set signal on the line 62 to go rapidly to 0 volts at the time t4. As a result, the oscillator frequency will be switched immediately to 300 Hz, as shown in FIG. 3(e). The detected logic signal will also begin charging up the timing capacitor C1 via the resistor R2. After a delay of approximately 3 ms, the drive control signal will be switched to a high level at time t5 so as to disable the gates G1 and G2. Thus, the drive signals on the lines 56, 58 will be removed from the input of the converter 12. There will be no pulses from the converter 12 at the time t5 since it will be shut off.

For purposes of completeness in the disclosure of the above-described standby power supply system but not for purposes of limitation, the following representative values and component identification are submitted. These values and component values were employed in a system that was constructed and tested and which provides a high quality performance.

| PART | TYPE or VALUE |
| --- | --- |
| relay 36 | SPDT, 12V coil |
| transformer T1, T2 | 24V C.T./130V; 120V/2.5V |
| NOR gates G1–G3 | CD4001B |
| diodes D1, D2 | IN4148 |
| transistor Q1 | MPSU-05 |
| resistors R1,R2; R3,R6; R4 | 430K; 33K; 50K |
| capacitors C1–C3 | .01uf; .33uf; .1uf |
| potentiometer R5 | 50K |
| IC1 | CMOS Timer, TLC555 |
| IC2 | CMOS Flip-flop, CD4013B |
| transistor Q501 | 2N5087 |
| capacitor C501 | .1uf |
| UA–UD | Quad comparator, LM339C |
| resistors R46,R413,R414 | 27K; |
| capacitors C42–C44 | .1uf; .47uf; .47uf |
| transistors Q601, Q602 | MOSFET IRFZ44 |
| diodes D601, D602 | IN4002 |
| Zeners D603, D604 | IN5259 |
| resistors R601, R602 | 100 ohms |

As can be seen, the converter 12 functions as a variable frequency inverter whose frequency is higher than the normal utility frequency at the time of transfer from the standby mode to the back-up mode and then gradually sweeps down to a steady-state frequency equal to the utility line frequency. Further, the converter 12 is caused to operate immediately at the higher frequency at the time of transfer from active-backup and the converter is turned off after a short delay so as to insure that the relay contact has settled in the energized position.

The standby power supply system of the present invention has the following advantages over the prior art:

(1) It eliminates saturation of magnetic components at start-up since the higher frequency reduces flux density;

(2) It limits the duration of current surges caused by arcing of the relay contact since the higher frequency shortens the period between zero-crossings; and (3) It maintains a constant input power (peak, rms and average) to the load.

From the foregoing detailed description, it can thus be seen that the present invention provides an improved standby power supply system for preventing saturation of magnetic components thereof during its initial start-up. The power supply system of the present invention includes a variable frequency inverter that is responsive to control signals for generating an initial frequency which is higher than the frequency of the utility line voltage and which is swept down gradually to the frequency of the line voltage when a detected logic signal is at the low logic level.

For technological background and for a discussion of conventional circuits and associated components used in the field of power conversion, references are made to "Principles of Solid-State Power Conversion," pp. 565–566, 578–583, authored by Ralph E. Tarter, Howard W. Sams & Co., 1985; "The Theory and Practice of Overcurrent Protection," pp. 7–8, 50 and 140, authored by Patrick J. McCleer, Mechanical Products Inc., 1987; and "The Art of Electronics," pp. 286–290, 507–510, authored by Paul Horowitz, Cambridge University Press, 2nd Edition, 1989. These materials are incorporated herein by reference.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A standby power supply system for reducing stress and preventing saturation of components in an inverter means at the time of transfer from a utility line voltage to a back-up inverter mode comprising:
   input terminal means connectible to a main A.C. power source for receiving the utility line voltage;
   output terminal means connectible to a load;
   line detection means responsive to said utility line voltage for generating a detected logic signal which is at a low level when said utility line voltage is less than a predetermined minimum voltage value;
   push-pull DC-AC inverter means having an input, and an output;
   switch means responsive to said detected logic signal for disconnecting said load from said input terminal means and for connecting said load to said output of said inverter means in order to cause the transfer from the utility line voltage to the back-up inverter mode;
   oscillator means responsive to said detected logic signal for generating push-pull drive signals to said input of said inverter means, said push-pull drive signals having an initial higher frequency at the time of transfer from the utility line voltage to the back-up inverter mode which is swept down gradually to the frequency of the line voltage; and
   timing means responsive to detected logic signals for delaying said drive signals to the input of said inverter means for a predetermined time so as to insure that said load has been disconnected from said input terminal means, whereby said higher frequency of said push-pull drive signals at the time of transfer eliminates stress of the magnetic components in said inverter means and limits duration of current surges caused by said switch means.

2. A standby power supply system as claimed in claim 1, wherein said switch means is comprised of an inverter having an input connected to said line detection means and an output, and a transfer relay connected to the output of said inverter and having a normally-open contact connected between said input terminal means and said output terminal means and a normally-closed contact connected between said output of said inverter means and said output terminal means.

3. A standby power supply system as claimed in claim 1, wherein said line detection means is comprised of a line detector circuit having its input coupled to said input terminal means and its output generating said detected logic signal.

4. A standby power supply system as claimed in claim 1, wherein said timing means includes an on/off timing circuit having an input and an output, said input being connected to said line detection means for receiving said detected logic signal and said output for generating a drive control signal.

5. A standby power supply system as claimed in claim 4, wherein said timing means further includes a drive control circuit having a first input connected to receive said drive control signal, a second input connected to the output of said oscillator means, and an output connected to the input of said inverter means.

6. A standby power supply system as claimed in claim 1, wherein said oscillator means includes a ramp circuit having an input connected to receive said detected logic signal and an output for generating a sweep signal.

7. A standby power supply system as claimed in claim 6, wherein said oscillator means further includes an oscillator having its input connected to receive said sweep signal and its output for generating said drive signals.

8. A standby power supply system as claimed in claim 1, wherein said initial higher frequency of said drive signals is approximately 300 Hz.

9. A standby power supply system as claimed in claim 1, wherein said initial higher frequency of said drive signals is approximately 3 to 6 times greater than said line frequency.

10. A standby power supply system for reducing stress and preventing saturation of components in an inverter means at the time of transfer from a utility line voltage to a back-up inverter mode comprising:
   input terminal means connectible to a main A.C. power source for receiving the utility line voltage;
   output terminal means connectable to a load;
   line detection means responsive to said utility line voltage for generating a detected logic signal which is at a low level when said utility line voltage is less than a predetermined minimum voltage value;
   variable frequency push-pull DC-AC inverter means having an input and an output;
   said variable frequency inverter means being responsive to control signals for generating an initial frequency which is higher than the frequency of said utility line voltage at the time of transfer from the utility line voltage to the back-up inverter mode and which is swept down gradually to the frequency of said line voltage when said logic signal is at the low logic level; and control circuitry means responsive to said detected logic signal for generating said control signals.

11. A standby power supply system as claimed in claim 10, wherein said control circuitry includes switch means, oscillator means, and timing means.

12. A standby power supply system as claimed in claim 11, wherein said switch means is comprised of an inverter having an input connected to said line detection means and an output, and a transfer relay connected to the output of said inverter and having a normally-open contact connected between said input terminal means and said output terminal means and a normally-closed contact connected between said output of said inverter means and said output terminal means.

13. A standby power supply system as claimed in claim 12, wherein said line detection means is comprised of a line detector circuit having its input coupled to said input terminal means and its output generating said detected logic signal.

14. A standby power supply system as claimed in claim 13, wherein said timing means includes an on/off timing circuit having an input and an output, said input being connected to said line detection means for receiving said detected logic signal and said output for generating a drive control signal.

15. A standby power supply system as claimed in claim 14, wherein said timing means further includes a drive control circuit having a first input connected to receive said drive control signal, a second input connected to the output of said oscillator means, and an output connected to the input of said inverter means.

16. A standby power supply system as claimed in claim 15, wherein said oscillator means includes a ramp circuit having an input connected to receive said detected logic signal and an output for generating a sweep signal.

17. A standby power supply system as claimed in claim 16, wherein said oscillator means further includes an oscillator having its input connected to receive said sweep signal and its output for generating said drive signals.

18. A standby power supply system as claimed in claim 10, wherein said initial higher frequency of said drive signals is approximately 300 Hz.

19. A standby power supply system as claimed in claim 10, wherein said initial higher frequency of said drive signals is approximately 3 to 6 times greater than said line frequency.

* * * * *

UNITED STATES PATENT AND TRADEMARK OFFICE
CERTIFICATE OF CORRECTION

PATENT NO. : 5,369,561
DATED : November 29, 1994
INVENTOR(S) : David J. McCullough It is certified that error appears in the above-identified patent and that said Letters Patent is hereby corrected as shown below:

Col. 5, line 36: After "potentiometer" should be --R5--;

Col. 7, line 7: After "circuit" should be --14--.

Signed and Sealed this

Sixteenth Day of May, 1995

Attest:

BRUCE LEHMAN

*Attesting Officer*            *Commissioner of Patents and Trademarks*